Figure 1:
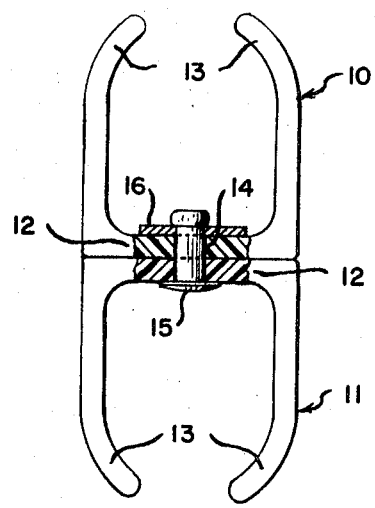

United States Patent [19]
Eross

[11] 3,747,166
[45] July 24, 1973

[54] HOSE HOLDER
[75] Inventor: Bela Eross, Penn Hills Twp., Allegheny County, Pa.
[73] Assignee: Instrumentation Industries, Inc., Pittsburgh, Pa.
[22] Filed: May 21, 1971
[21] Appl. No.: 145,801

[52] U.S. Cl............................ 24/81 CC, 24/81 HS
[51] Int. Cl............................................ A44b 21/00
[58] Field of Search ................. 248/229; 24/81 CL, 24/81 PA, 81 PH, 81 CC, 81 A, 81 AD, 81 BA, 81 CR, 81 TH, 81 HS, 81 AE, 208 A

[56] References Cited
UNITED STATES PATENTS
| | | | |
|---|---|---|---|
| 1,942,701 | 1/1934 | Hilton.............................. | 24/81 AE |
| 2,171,665 | 9/1939 | Meltzer............................ | 24/81 HS |
| 2,426,326 | 8/1947 | Tooms ....................... | 24/208 A UX |
| 3,251,069 | 5/1966 | Clark............................ | 24/81 CC X |

FOREIGN PATENTS OR APPLICATIONS
| | | | |
|---|---|---|---|
| 109,050 | 11/1939 | Australia ......................... | 24/81 CR |
| 625,705 | 7/1949 | Great Britain.................... | 24/81 CC |
| 785,300 | 10/1957 | Great Britain...................... | 248/229 |

Primary Examiner—Donald A. Griffin
Attorney—Buell, Blenko & Ziesenheim

[57] ABSTRACT

The specification discloses a holder for hose or other flexible tubing. it comprises two essentially C-shaped elements placed back-to-back and having a swivel connection therebetween. The elements are made of molded plastic or other resilient material. on installation, one of the C-shaped elements may be sprung over a rod-like support to grip the rod and the hose or tubing may be inserted between and gripped by the legs of the other C-shaped element. The swivel connection permits freedom of movement of the hose relative to the support.

4 Claims, 3 Drawing Figures

PATENTED JUL 24 1973  3,747,166

INVENTOR
Bela Eross

HOSE HOLDER

This invention relates to a disposable holder of simple construction and low-cost, for supporting a hose on a support member in a manner to permit freedom of movement of the hose relative to the support.

In the administration of oxygen to patients in hospitals, the oxygen is supplied from a source, frequently located on a wall, to the patient in a bed through a relatively long flexible hose or tubing. Due to the length and weight of the tubing, some intervening support is desirable to avoid discomfort to the patient. Moreover, unless the patient has relative freedom of movement, it is possible that the hose connection may be interrupted or the supply of oxygen through the hose restricted, due to twisting of the hose in consequence of movement of the patient.

In order to alleviate these difficulties, I provide a holder of simple construction and low-cost for holding the hose through which oxygen is supplied to a hospital patient, while at the same time permitting freedom of movement of the hose to accomodate to the movements of the patient.

I am aware of swiveling support devices, of which that shown in U.S. Pat. No. 3,297,293 is illustrative. However such devices are not suited to the needs in a hospital, as hereinbefore described, for the reason that they do not provide an easy and convenient means of attachment to a support or of attachment of the hose thereto, as does the hose holder which I have devised. Moreover, they are relatively costly and are not disposable. In contrast, the holder which I provide is of such low-cost that it may be readily and conveniently disposed of to avoid repeated use from patient to patient.

Figure 2:
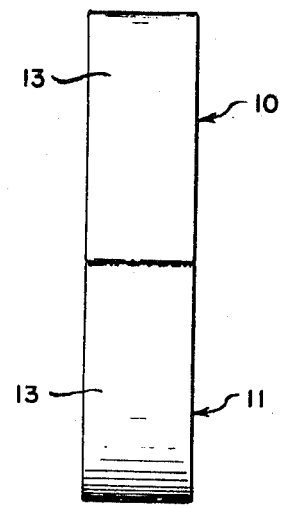
Figure 3:
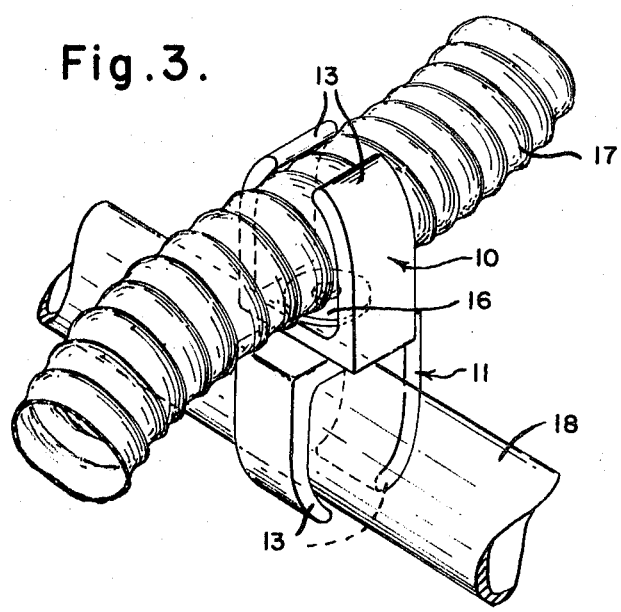

Other advantages of the holder which I provide will become apparent in the subsequent description thereof when read in connection with the accompanying drawings, wherein FIG. 1 is an elevational view, partly in section, showing an embodiment of my invention, FIG. 2 is a profile view of the embodiment of FIG. 1, and FIG. 3 is a perspective view, showing the manner in which the embodiment of FIG. 1 is employed to hold a hose and support it in position, with freedom of movement.

Referring to the drawings, the embodiment of invention shown comprises two essentially C-shaped elements 10 and 11, of suitable plastic or other resilient material. The elements are illustratively shown as of identical size and contour but they may be different. However, each of the elements has a straight portion 12 and two legs 13 extending substantially normal to the straight portion from opposite ends thereof. The extremities of the legs are curved inwardly toward each other to better serve the purpose of holding the hose and of attachment to a rod-like support member, such as forms part of the guard rail at the side of a patient's bed.

The straight portion of each element has a central hole 14 and the two holes are in registry when the elements are placed back-to-back, with the straight portions 12 of the two elements in side-by-side relation and the legs 13 extending in opposite directions.

A swivel connection between the two elements 10 and 11 is provided by a so-called pop-rivet 15 which extends through the registering holes 14 in the straight portion 12 of the elements. To avoid abrasion of the elements and insure a snugly tight connection, a washer 16 is preferably provided under the upset end of the rivet.

Referring now to FIG. 3 in particular, the manner in which the embodiment of the invention shown in FIGS. 1 and 2 may be used will now be described.

After first determining the most desirable location on the hose 17, through which oxygen is supplied to the patient, the operator presses the portion of the hose so located, into the gap between the extremities of the legs on one of the elements 10 or 11, the legs being sprung apart sufficiently to enable the hose to enter the space between the legs, and to be snugly gripped by the curved ends of the legs which, due to resiliency, spring back to their original contour.

Having ascertained the appropriate location to support the hose, the operator then presses the free element 10 or 11, down on a rod-like support, such as a member 18 of the guard rail at the side of a patient's bed so that the legs are sprung apart, allowing the support member 18 to enter between and then be gripped by the legs of the element.

It will be apparent that adjustment may be readily and quickly made, either in the point of attachment of the holder portion to the hose or of the clamp portion to the support member. Moreover, by reason of the swivel connection between the elements 10 and 11, the hose 17 may be rotated on the support member 18, as desired to suit the movements of the patient or otherwise, through a complete circle of 360°.

A hose clamp according to this invention made of plastic or similar non-metallic resilient material has the advantage not only of disposability and inexpensiveness but the further important advantage that it will not spark on striking a metal object as metals will do and thus a potentially dangerous source of fire in the presence of oxygen is avoided.

While a specific embodiment has been shown and described, variations may be made therein within the scope of the appended claims.

I claim:

1. A holder for hose, tubing and the like, comprising a pair of like C-shaped elements, each of said elements having two spaced apart legs and being made of resilient non-metallic non-sparking material, the legs of one of said elements being sprung to receive and grip the said hose, and the legs of the other of said elements being sprung to receive and grip a rod-like member, and means joining said elements in back-to-back swiveling relation and providing a swivel connection therebetween, each of said elements comprising a straight portion and two legs projecting in a substantially normal relation from the opposite ends of the straight portion, the extremities of the legs being curved inwardly toward each other, and wherein the said means providing the swivel connection is located centrally of the straight portions of said elements and said straight portions provide support between said elements, said swivel connection comprising a pivot member extending through registering holes in the elements and securing them together and means associated with the pivot means insuring a snugly tight connection free from abrasion on the elements.

2. A holder for hose according to claim 1, wherein each of said elements is molded integrally of resilient plastic material.

3. A holder for hose according to claim 1, wherein said elements are substantially identical in size and contour.

4. A holder for hose, tubing and the like, comprising a pair of like C-shaped elements, each of said elements having two spaced apart legs and being made of resilient non-metallic non-sparking material, the legs of one of said elements being sprung to receive and grip the said hose, and the legs of the other of said elements being sprung to receive and grip a rod-like member, and means joining said elements in back-to-back swiveling relation and providing a swivel connection therebetween, each of said elements comprising a straight portion and two legs projecting in a substantially normal relation from the opposite ends of the straight portion, the extremities of the legs being curved inwardly toward each other, and wherein the said means providing the swivel connection is located centrally of the straight portions of said elements and said straight portions provide support between said elements, said swivel connection comprising a pop rivet extending through registering holes in the elements and securing them together and means associated with the pop rivet insuring a snugly tight connection free from abrasion on the elements.

\* \* \* \* \*